United States Patent [19]

Matsumura

[11] 4,361,904
[45] Nov. 30, 1982

[54] METHOD OF TESTING TRANSCEIVER AND TRANSCEIVER INCLUDING TESTING APPARATUS

[75] Inventor: Akira Matsumura, Yokosuka, Japan

[73] Assignee: Nissan Motor Company, Limited, Kanagawa, Japan

[21] Appl. No.: 170,046

[22] Filed: Jul. 17, 1980

[30] Foreign Application Priority Data

Jul. 31, 1979 [JP] Japan .................. 54-97822

[51] Int. Cl.³ ............................. H04B 17/00
[52] U.S. Cl. ........................ 455/67; 375/7; 375/10; 455/115; 455/73
[58] Field of Search .............. 455/6, 7, 78, 9, 84–86, 455/115, 217, 226, 67, 73; 375/10, 7, 8; 371/15, 22; 370/29; 343/762, 761; 340/775, 167 R, 822.57; 324/77 R

[56] References Cited

U.S. PATENT DOCUMENTS

| | | | |
|---|---|---|---|
| 2,561,363 | 7/1951 | Haeff et al. | 455/86 |
| 2,922,130 | 1/1960 | Matheson | 343/762 |
| 3,324,472 | 6/1967 | Sundberg | 343/762 |
| 3,478,317 | 11/1969 | Hales | 340/167 R |
| 3,500,459 | 3/1970 | Battin et al. | 455/78 |
| 3,665,481 | 5/1972 | Low et al. | 343/762 |
| 3,970,940 | 7/1976 | Venn | 455/115 |
| 4,048,564 | 9/1977 | Gleeson, Jr. | 455/67 |
| 4,072,900 | 2/1978 | Ray | 455/67 |

FOREIGN PATENT DOCUMENTS

| | | |
|---|---|---|
| 2135771 | 10/1972 | Fed. Rep. of Germany . |
| 670302 | 4/1952 | United Kingdom . |
| 814114 | 5/1959 | United Kingdom . |
| 958634 | 5/1964 | United Kingdom . |
| 1179224 | 1/1968 | United Kingdom . |
| 1296600 | 11/1972 | United Kingdom . |
| 2024568 | 1/1980 | United Kingdom . |

*Primary Examiner*—Benedict V. Safourek
*Assistant Examiner*—Stephen Chin
*Attorney, Agent, or Firm*—Lowe, King, Price & Becker

[57] ABSTRACT

An ultra high frequency transceiver which transmits a modulated carrier wave and mixes a received signal with a locally generated signal to produce an intermediate frequency signal is tested by using the same transmitter as used during normal transceiver operation and by modulating the carrier with a wave having sudden transitions. A portion of the transmitted wave is reflected back to a receiver segment of the transmitter to produce an i.f. signal that is detected by a demodulator. Each transition causes the demodulator to detect a pulse signal. In response to the pulse signal being detected and not being detected during a testing interval, indications are derived to signal that the transceiver is and is not operating properly, respectively.

17 Claims, 7 Drawing Figures

(a) CLOCK SIGNAL (b) MIXER INPUT (c) MIXER OUTPUT (d) DEMODULATOR OUTPUT

METHOD OF TESTING TRANSCEIVER AND TRANSCEIVER INCLUDING TESTING APPARATUS

BACKGROUND OF THE INVENTION

1. Field of the Invention

The present invention relates to an ultra high frequency transceiver with a self-testing facility.

2. Description of the prior art

A conventional ultra high frequency transceiver comprises substantially an ultra high frequency oscillator, a modulator, a mixer, a band-pass filter, and a demodulator.

In order to check whether the ultra high frequency transceiver is functioning normally or not, a pulse modulated signal of a given carrier frequency is fed from an antenna of the transceiver into the band-pass filter at the output of which a check is made to detect the presence of a failure within any circuit constituting the transceiver unit.

According to the conventional transceiver testing method, however, additional pulse modulating and ultra high frequency oscillating units are required to produce a pulse modulated signal of the same carrier frequency.

Therefore, if there are no such modulating and oscillating units, the presence of failure within any circuit constituting the transceiver unit could not be detected before communications begin with another transceiver station.

BRIEF SUMMARY OF THE INVENTION

The ultra high frequency transceiver of the present invention is so designed as to detect the presence or absence of a failure within any circuit constituting the transceiver unit by actuating a built-in self-testing facility prior to communications.

In an embodiment of the present invention, if an abnormality occurs anywhere in the ultra high frequency transceiver, the self-testing facility optically indicates the presence of a failure.

In another embodiment of the present invention, after indication of the a failure of the transceiver unit is detected, the power supply is automatically interrupted to prevent a partial failure from causing possible further damage.

In another third embodiment of the present invention, after indication of the a failure of the transceiver unit is detected the pulse modulated signal is definitely fed back to the transceiver unit to locate the trouble.

BRIEF DESCRIPTION OF THE DRAWINGS

The features and advantages of the ultra high frequency transceiver according to the present invention will be more clearly appreciated from the following description taken in conjunction with the accompanying drawings in which like reference numerals designate corresponding elements, and in which.

DETAILED DESCRIPTION OF THE INVENTION

Figure 1:
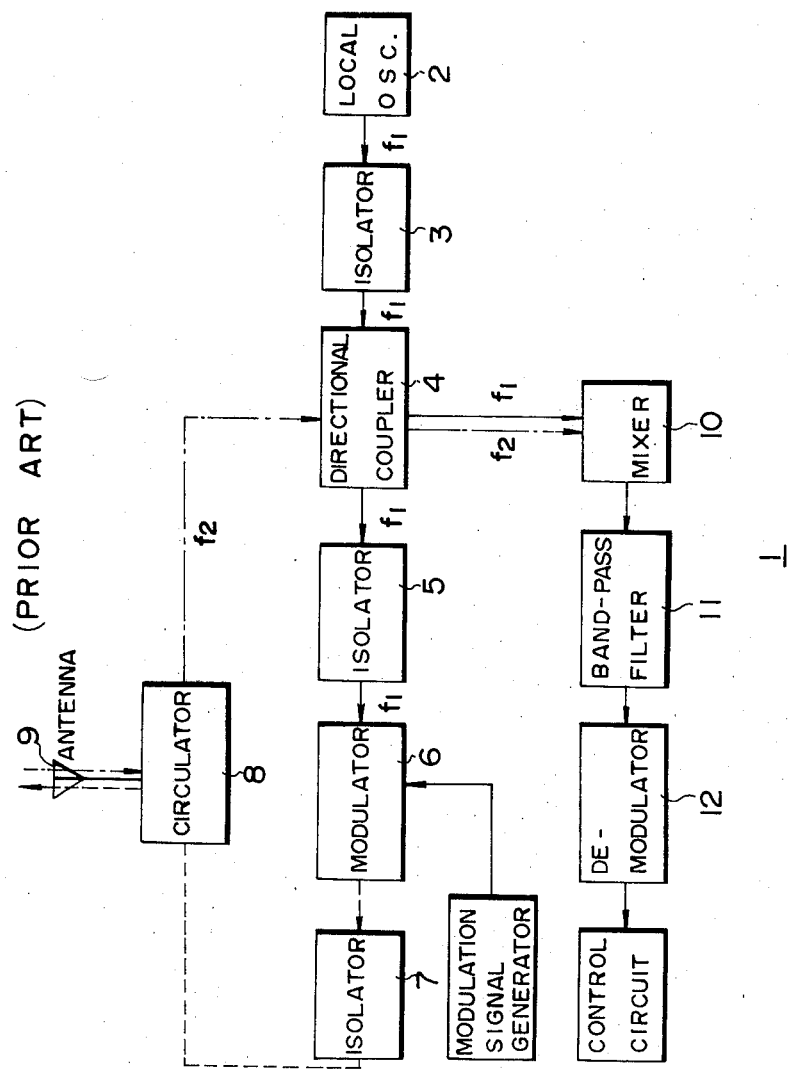
FIG. 1 is a simplified block diagram of a conventional ultra high frequency transceiver.

To facilitate understanding of the present invention, a brief reference is made to the conventional ultra high frequency transceiver depicted in FIG. 1. This conventional ultra high frequency transceiver 1 comprises, substantially, an ultra high frequency oscillator 2 such as a Gunn oscillator, isolators 3, 5, and 7, a directional coupler 4, a modulator 6, a circulator 8, an antenna 9, a mixer 10, a band-pass filter 11, and a demodulator 12.

A locally generated UHF signal of frequency $f_1$ derived from the oscillator 2 is fed into the modulator 6 via the isolator 3, directional coupler 4, and isolator 5 (shown by solid arrows).

The UHF signal $f_1$ is modulated by the modulation signal in the modulator 6 and radiated from the antenna 9 via the isolator 7 and circulator 8 (shown by a dashed line and arrows).

A carrier frequency signal $f_2$ received by the antenna 9 is supplied to the mixer 10 via the circulator 8 and directional coupler 4 (shown by a dotted and dashed line with arrows).

The UHF signal $f_1$ is also partially fed into the mixer 10 by means of the directional coupler 4. The mixer 10 serves to mix signals $f_1$ and $f_2$.

The output of the mixer 10 is fed to the bandpass filter 11 which has a central frequency which is the difference between the frequencies of $f_1$ and $f_2$.

In a conventional method of checking the output of the band-pass filter or demodulator to ensure that there is no failure in the apparatus, a pulse modulated signal of carrier frequency $f_2$ is fed to the antenna by another apparatus such as an ultra high frequency oscillator or pulse modulator.

This, of course, is quite expensive and time consuming.

Figure 2:
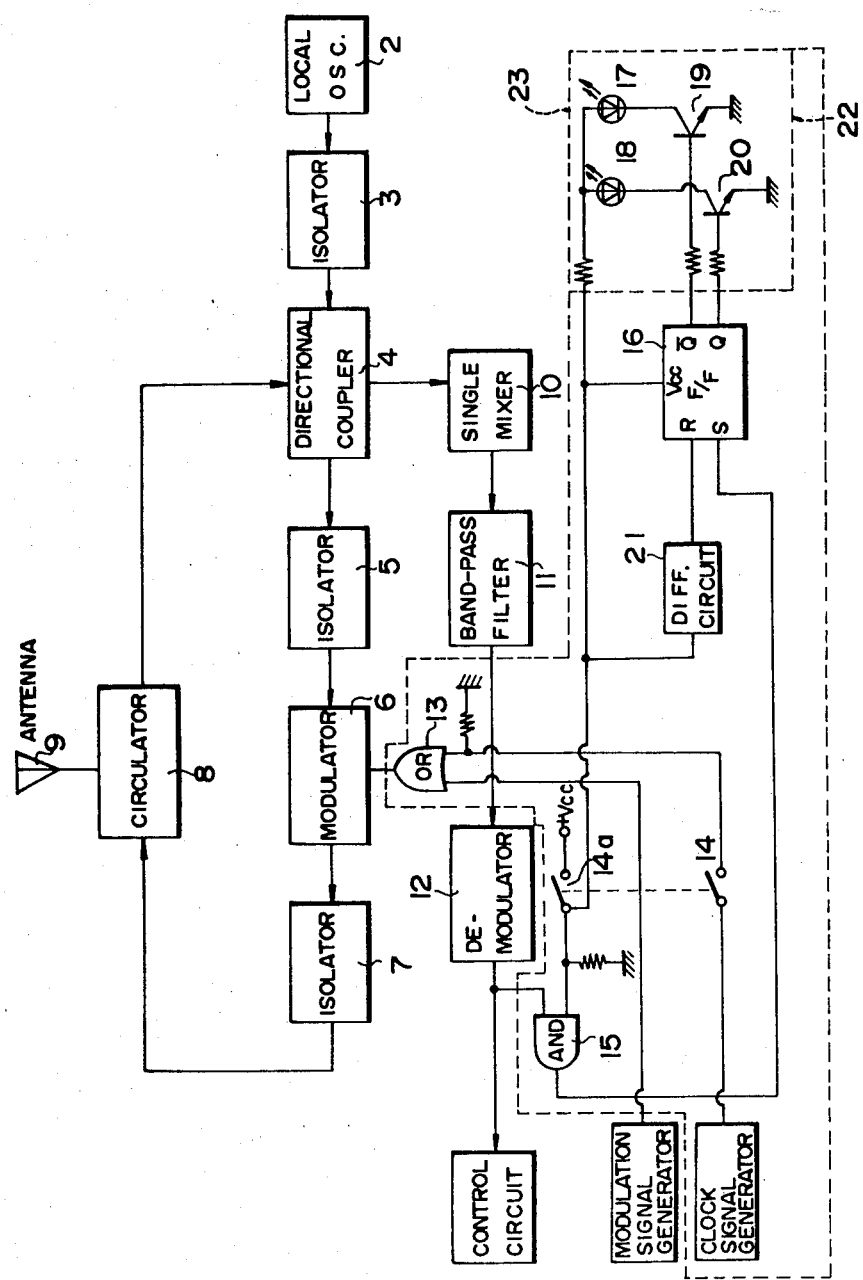
FIG. 2 is a simplifed block diagram and partial circuit diagram of a preferred embodiment of the present invention.

In view of the above problem, reference is now made to FIGS. 2 to 7, and more particularly to FIG. 2, wherein a preferred embodiment of the ultra high frequency transceiver according to the present invention is illustrated.

The same reference numerals as used in FIG. 1 designate corresponding parts in the several drawings.

Self-testing circuit 23 (FIG. 2) detects the presence or absence of a failure in the transceiver.

The self-testing facility 23 comprises an OR gate 13, switch 14, AND gate 15, flip-flop 16 and differentiator 21. OR gate 13 has first and second input terminals respectively connected to a clock signal generator via a switch 14 and to a modulation signal generator; OR gate 13 has an output terminal connected to the modulator 6. AND gate 15 includes first and second input terminals respectively connected to the output of demodulator 12 and to the bias supply $+V_{cc}$ via a switch 14a mechanically interconnected to the switch 14. Set and reset terminals S and R of flip-flop 16 are respectively connected to the output terminal of the AND gate 15 and to an output of differentiating circuit 21; output terminals $\overline{Q}$ and Q of flip-flop 16 are connected to control a display circuit 22.

The display circuit 22 comprises transistors 19 and 20. Transistor 19 has a base connected to the Q terminal of the flip-flop 16 and a collector selectively connected via a light emitting diode (hereinafter abbreviated as LED) 17 and the switch 14a to bias supply $+V_{cc}$. Transistor 20 has a base connected to the $\overline{Q}$ terminal of the flip-flop 16 and a collector selectively connected to bias supply $+V_{cc}$ via the switch 14a and another LED 18.

When the switch 14 is closed prior to communications, the UHF signal from the UHF oscillator 2 is modulated by the clock signal (FIG. 3(a)).

A portion of the pulse modulated signal from the modulator 6 $f_1$ is reflected from a flange connecting antenna 9 and circulator 8 or objects near the antenna 9, or by spurious resonant circulation and arrives at the directional coupler 4.

Figure 3:
FIGS. 3 (a) to (d) are waveform charts associated with the preferred embodiment of the present invention shown in FIG. 2.
Figure 3:
Figure 3:
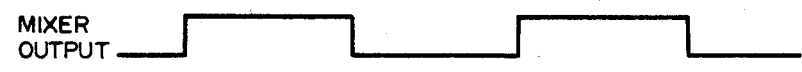
Figure 3:

This signal is supplied to the mixer 10 together with the locally generated UHF signal (FIG. 3 (b)).

The mixer 10 derives a signal (FIG. 3 (c)) similar to the modulated signal (FIG. 3 (a)) caused by constructive and destructive interference of the signal due to phase differences in the propagation path length.

This is because a similar output may be generated due to the detection capability of mixer 10. When the above output signal reaches the band-pass filter 11, only the harmonic component passes the filter and a pulse is generated when the pulse modulated signal rises or falls (FIG. 3(d)).

Since the switch 14 is interlocked, i.e., ganged with the switch 14a, the pulse signal is supplied to the set terminal S of the flip-flop 16 through the AND gate 15.

The flip-flop derives a high level (logical 1) voltage at the Q terminal and low level (logical 0) voltage at the $\overline{Q}$ terminal, respectively.

Then transistor 20 is turned on with the transistor 19 turned off. When the transistor 20 is turned on, the LED 18 is turned on to indicate that the ultra high frequency transceiver is functioning normally.

On the other hand, if there is abnormality (e.g. malfunction in, for example, the modulator 6 or mixer 10) in the ultra high frequency transceiver, the demodulator 12 does not produce the pulse modulated output shown in FIG. 3 (d).

Therefore, the flip-flop 16 receives the output signal from the differentiating circuit 20 at the reset terminal R and maintains a high level (logical 1) voltage at the $\overline{Q}$ terminal and low level (logical 0) voltage at the Q terminal.

As a result, transistor 19 and LED 17 only turns on to illuminate 17.

Figure 4:
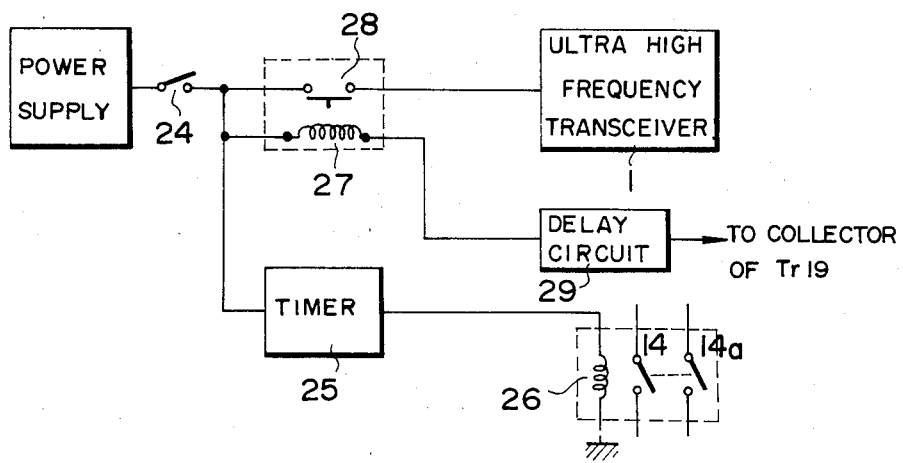
FIG. 4 is a simplified block diagram of a second preferred embodiment of the present invention.

FIG. 4 is a circuit diagram of a second preferred embodiment of the present invention in which the power supply is automatically interrupted if there is any failure in the ultra high frequency transceiver.

In this embodiment of the present invention, the ultra high frequency transceiver comprises substantially the ultra high frequency transceiver section 1 shown in FIG. 1, a power switch 24 for the ultra high transceiver section 1, a timer 25 which operates for a predetermined period of time after the power switch 24 is closed. Relay coil 26 closes switches 14 and 14a in FIG. 2 in response to the output of timer 25. A relay coil 27 includes normally closed contact 28 which is opened when the transistor 19 is turned on, and a delay circuit 29 which provides delay for a predetermined period of time before actuation of the relay coil 27.

When the power switch 24 is closed, the relay coil 26 is actuated for a predetermined period of time to turn on switches 14 and 14a. At this time, the self-testing circuit 23 shown in FIG. 2 is activated.

Since the delay circuit 29 is provided, even if there is a delay between closing on of the switches 14 and 14a and the derivation of a pulse signal by the demodulator 11 (FIG. 2), the transistor 19 (FIG. 2) is not supplied with power. Thus the contact 28 remains closed. When there is no failure in the ultra high frequency transceiver 1, communication with another transceiver can be established by the power supplied by supply 24 to the transceiver via contact 28.

When, on the other hand, there is a failure in the ultra high frequency transceiver 1, the transistor 19 turns on after a period of time determined by the delay circuit 29 to actuate the relay coil 27. At this time, the normally closed contact 28 is opened to interrupt the power supplies by supply 24 to the ultra high frequency transceiver section 1.

In the second embodiment of the present invention, the self-testing of the transceiver unit 1 to determine whether it is operating normally is automatically determined when the power switch 24 is closed. When the failure within the transceiver unit 1 is detected, the power supply is automatically interrupted so that a partial failure cannot affect other parts of the ultra high frequency transceiver.

In a case where the power supply interruption circuit is applied to an automotive vehicle, the on position of an ignition key may serve as the on, i.e., closed, position of the power switch 24 and the ignition key start position may serve as the mechanism to close switches 14 and 14a.

In this arrangement, the timer 25 and relay coil 26 can be omitted.

Figure 5:
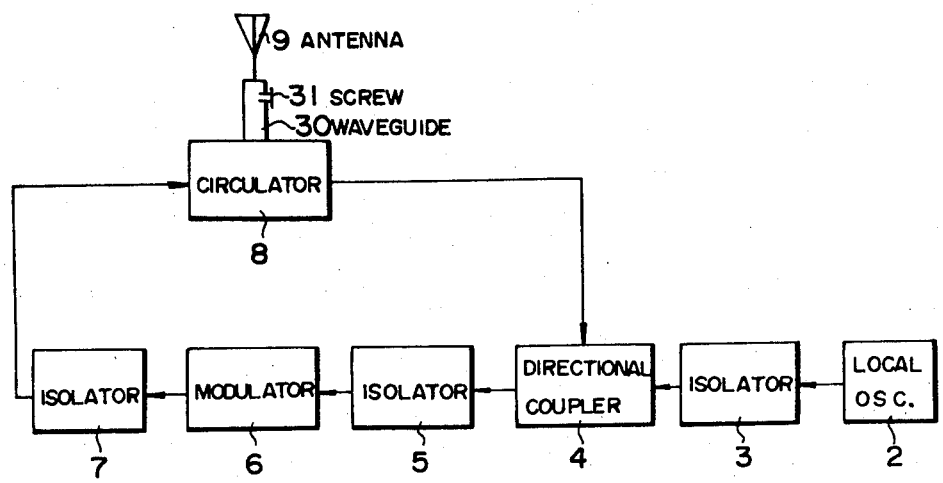
FIG. 5 is a simplified block diagram of a third preferred embodiment of the present invention.

FIG. 5 is a circuit diagram of third embodiment of the present invention in which a part of the modulated signal is positively fed back at the antenna 9 to the mixer 10.

A waveguide 30 provides a means for coupling the circulator 8 with an antenna 9. An adjustment screw 31 provided in the waveguide 30 provides a means for adjusting the amount of reflection of the modulated signal and the difference in the propagation path length.

Figures 6, 7:
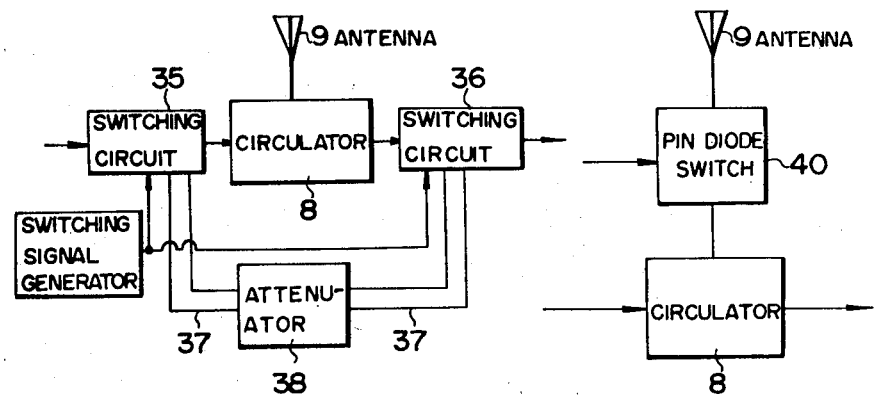
FIG. 6 is a simplified partial block diagram of a fourth preferred embodiment of the present invention.
FIG. 7 is a simplified partial block diagram of a fifth preferred embodiment of the present invention.

FIG. 6 is a circuit diagram of a fourth embodiment of the present invention in which there is provided an attenuator 38 within a second waveguide 37 for attenuating ultra high frequency signals to a desired degree. Waveguide switching circuits 35 and 36 are connected across the circulator 8 to bypass the circulator 8 through the second waveguide 37 and the attenuator 38.

FIG. 7 is a circuit diagram of a fifth embodiment of the present invention in which a PIN diode switch 40 is connected between the circulator 8 and antenna 9.

The modulated signal is reflected partially by controlling bias current to the PIN diode switch 40.

From the foregoing description, the ultra high frequency transceiver of the present invention is a simple addition or attachment of the self-testing circuit to the ultra high frequency transceiver proper that permits speedy and accurate detection of a failure within any circuit of the transceiver unit.

What is claimed is:

1. An apparatus for transmitting and receiving an ultra high frequency signal, which comprises:
   (a) a circuit for transmitting a pulse modulated signal, a portion of the energy in the transmitted pulse modulated signal being reflected due to an internal configuration or spurious resonant circulation of the transmitting circuit;

(b) a circuit mixing the reflected pulse modulated signal with a locally generated signal to produce an intermediate frequency signal having pulses that are a replica of pulses of the pulse modulated signal, the intermediate frequency signal pulses having leading and trailing edges;

(c) a circuit for demodulating the intermediate frequency signal derived from said mixing circuit to produce short duration pulse signals occurring in response to the leading and trailing edges of the intermediate frequency signal; and (d) another circuit for deriving a clock pulse, said transmitting circuit responding to the clock pulse to derive the pulse modulated signal, said another circuit detecting whether the short pulse signal at the output of said demodulating circuit is present or absent to ensure that the apparatus is functioning normally, said another circuit including: a clock signal generator for deriving the clock pulse for said transmitting circuit, first and second simultaneously closed switches, the first switch being connected to said clock signal generator, the second switch being connected to a bias supply, an AND gate having first and second input terminals respectively connected to an output terminal of said demodulating circuit and the second switch for passing the output signal of said demodulating circuit while said first and second switches are closed, an OR gate having an input terminal connected to said clock signal generator via said first switch, a differentiator for differentiating the bias supply voltage in response to said second switch being closed, a flip-flop having reset and set terminals respectively connected to said differentiator and to said AND gate, said flip-flop having Q and Q̄ output terminals on which are respectively derived a high-level voltage representing the occurrence of a short pulse signal at the output of said demodulating circuit and a high-level voltage representing the lack of a short pulse signal at the output of said demodulating circuit, and a display circuit for optically displaying first and second mutually exclusive indications in response to the high-level voltage signal from the Q and Q̄ output terminals of said flip-flop.

2. The apparatus of claim 1, further comprising:
(a) a power interrupting circuit for switching off the power to said apparatus a predetermined period of time after said flip-flop is activated to supply the high-level voltage signal from the Q output terminal to said display circuit.

3. The apparatus of claim 2, wherein said power interrupting circuit comprises:
(a) a delay circuit connected to said another circuit, said delay circuit deriving another output signal a predetermined period of time after the high-level output voltage signal is derived from the Q output terminal of said flip-flop; and
(b) a first relay having a coil connected to said delay circuit and energized in response to said delay circuit deriving the another output signal, said first relay having a normally closed contact connected between a power supply for the transmitting and receiving apparatus and the remainder of the transmitting and receiving apparatus, said normally closed contact opening in response to energization of said coil.

4. The apparatus of claim 1, further comprising:
(a) a relay having a coil, said first and second switches being closed in response to said coil being energized; and
(b) a timer connected to respond to the initial application of power to the transmitting and receiving apparatus for deriving an enabling signal for a predetermined period of time immediately after power is initially supplied to the transmitting and receiving apparatus, said timer being connected to energize the coil while the enabling signal is being derived.

5. The apparatus of claim 3, wherein said power interrupting circuit further comprises:
(a) a second relay having a second coil, said first and second switches being closed while said second coil is energized; and
(b) a timer connected to respond to the intial application of power to the transmitting and receiving apparatus for deriving an enabling signal for a predetermined period of time immediately after power is initially supplied to the transmitting and receiving apparatus, said timer being connected to energize the second coil while the enabling signal is being derived.

6. The apparatus of claim 1, 2, 3, 4 or 5 wherein said transmitting and receiving apparatus includes an antenna, a circulator for supplying energy from the transmitting apparatus to the antenna and for suppling energy transduced by the antenna to the receiving apparatus; and
(a) a first waveguide connected between said antenna and circulator for effectively coupling the modulated signal between the circulator and the antenna; and
(b) a means positioned between said antenna and circulator for reflecting a portion of the energy in the modulated signal back to said circulator, said reflecting means including means for variably controlling the amount of energy reflected back to the circulator.

7. The apparatus of claim 6 wherein said means for variably controlling includes a screw positioned within said waveguide.

8. The apparatus of claim 6 wherein said means for variably controlling comprises a PIN diode, bias current for the PIN diode being such that the PIN diode partially reflects energy in the modulated signal supplied by said circulator to said antenna back to the circulator.

9. The apparatus of claim 6 wherein said apparatus further comprises:
(a) a second waveguide for feeding the modulated signal back to said mixing circuit to bypass said circulator;
(b) an attenuator positioned in said second waveguide to be responsive to part of the energy of the modulated signal for attenuating the signal to a desired degree; and
(c) two waveguide switching circuits for selectively connecting said second waveguide to said transmitting circuit.

10. A method of testing a transceiver without employing auxiliary transmitter circuitry, the transceiver, during normal, non-testing operation, deriving a carrier and transmitting a modulated carrier and mixing a received carrier, a portion of the energy of the transmitted modulated carrier being reflected back to a receiver segment of the transceiver, the testing method comprising suddenly increasing and decreasing the amount of modulation of the transmitted carrier, the carrier energy reflected back to the receiver being modified to include the sudden increases and decreases in the amount of modulation of the transmitted carrier, the mixing of the reflected received carrier energy including the sudden increases and decreases and resulting in a pulse each time the amount of modulation is increased and decreased, detecting the pulses, activating a first indicator for signalling that the transceiver is operating normally in response to the derivation of the detected pulse, and activating a second indicator for signalling that the transceiver is not operating normally in response to no detected pulse being derived during testing.

11. The method of claim 10 wherein the pulse includes harmonic components, the detecting process responding only to the harmonic components.

12. A transceiver comprising a source of carrier waves, means for modulating the carrier waves to derive a modulated carrier wave, a portion of the modulated carrier wave energy being reflected back to the transceiver, said modulating means including means for selectively suddenly increasing and decreasing the amount of modulation on the carrier during an interval while the transceiver is being tested, whereby the modulated carrier wave and the reflected carrier wave include sudden increases and decreases in the amount of modulation on the carriers thereof during the testing interval, the carrier waves from the same source that is modulated during testing being modulated during normal, nontesting transmitter operation of the transceiver, means for mixing the reflected carrier wave, said means for mixing being operative during normal non-testing operation and during the testing interval to derive a pulse each time the amount of carrier modulation is suddenly increased and decreased during testing and to derive a replica of wave energy received by the transceiver during normal operation, means for detecting the pulses, and indicator means responsive to the detected pulses only during the testing interval for indicating that the transceiver is or is not properly operating in response to the pulses being or not being detected during the testing interval.

13. The transceiver of claim 12 wherein the pulse includes harmonic components, and the detecting means includes a filter for passing only the harmonic components.

14. The transceiver of claim 12 or 13 further including means for delaying activation of the means for indicating that the transceiver is not normally operating for a predetermined interval after power is initially applied to the transceiver, means for decoupling power from the transceiver in response to the means for indicating signalling that the transceiver is not normally operating.

15. The transceiver of claim 12 or 13 further including means for decoupling power from the transceiver in response to the means for indicating signalling that the transceiver is not normally operating.

16. The transceiver of claim 15 further including means responsive to the transceiver not operating porperly for preventing operation of the transceiver.

17. The transceiver of claim 12 further including means responsive to the transceiver not operating properly for preventing operation of the transceiver.

* * * * *